US008972508B1

(12) United States Patent
Brown et al.

(10) Patent No.: US 8,972,508 B1
(45) Date of Patent: *Mar. 3, 2015

(54) METHODS AND SYSTEMS FOR MANAGING EMAIL CONFIGURATION

(75) Inventors: Timothy G. Brown, Fort Edward, NY (US); Brian Hernacki, San Carlos, CA (US)

(73) Assignee: Symantec Corporation, Mountain View, CA (US)

(*) Notice: Subject to any disclaimer, the term of this patent is extended or adjusted under 35 U.S.C. 154(b) by 77 days.

This patent is subject to a terminal disclaimer.

(21) Appl. No.: 13/543,730

(22) Filed: Jul. 6, 2012

Related U.S. Application Data

(63) Continuation of application No. 12/059,072, filed on Mar. 31, 2008, now Pat. No. 8,244,814.

(51) Int. Cl.
*G06F 15/16* (2006.01)

(52) U.S. Cl.
USPC ........... 709/206; 709/204; 709/207; 709/230; 709/246; 726/6; 726/13; 370/392

(58) Field of Classification Search
CPC ..... H04L 51/08; H04L 51/066; G06Q 10/107
USPC ................ 709/204–207, 230–246; 726/6–13; 370/392
See application file for complete search history.

(56) References Cited

U.S. PATENT DOCUMENTS

| 5,283,887 | A | 2/1994 | Zachery |
| 5,765,178 | A | 6/1998 | Tanaka |
| 5,872,926 | A | 2/1999 | Levac et al. |
| 6,421,733 | B1 | 7/2002 | Tso et al. |
| 6,529,942 | B1 | 3/2003 | Gilbert |
| 7,209,955 | B1 * | 4/2007 | Major et al. .................. 709/207 |
| 7,774,832 | B2 * | 8/2010 | Poling et al. ................... 726/12 |
| 7,797,386 | B2 * | 9/2010 | Burns ........................... 709/206 |
| 8,438,616 | B2 * | 5/2013 | Chai et al. ......................... 726/4 |
| 2001/0004744 | A1 * | 6/2001 | Lazaridis et al. ............. 709/206 |
| 2002/0040387 | A1 * | 4/2002 | Lessa et al. .................. 709/206 |
| 2002/0091806 | A1 | 7/2002 | Shackleford |

(Continued)

OTHER PUBLICATIONS

Converting PC GUIs for NonPC Devices; Feb. 1998 Circuit Cellar Ink pp. 40-42, 44-45.*

(Continued)

*Primary Examiner* — Razu Miah
(74) *Attorney, Agent, or Firm* — ALG Intellectual Property, LLC

(57) ABSTRACT

A computer-implemented method for managing email configuration may include receiving a first email message from a first device, identifying device-type information in the first email message, identifying a second email message addressed to the first email address, and using the device-type information to select email-configuration information for the second email. The method may further include reformatting a body of the second email based on the email-configuration information, removing an attachment to the second email in response to the email-configuration information, providing a user with the email-configuration information for the second email message, and associating the device-type information with the first email address. A computer-implemented method for including email-configuration information in an email may involve identifying a first email message from a first user, including email-configuration information in the first email message, and sending the first email message to a first recipient. Corresponding systems are also disclosed.

20 Claims, 8 Drawing Sheets

(56) References Cited

U.S. PATENT DOCUMENTS

| | | | |
|---|---|---|---|
| 2002/0174010 A1* | 11/2002 | Rice, III | 705/14 |
| 2005/0172034 A1* | 8/2005 | Sakai et al. | 709/250 |
| 2005/0216421 A1* | 9/2005 | Barry et al. | 705/64 |
| 2005/0286514 A1* | 12/2005 | Cheshire | 370/389 |
| 2006/0089994 A1* | 4/2006 | Hayes | 709/227 |
| 2006/0218234 A1* | 9/2006 | Deng et al. | 709/206 |
| 2007/0014277 A1 | 1/2007 | Ebbesen et al. | |
| 2007/0042710 A1* | 2/2007 | Mahini et al. | 455/3.03 |
| 2007/0086388 A1* | 4/2007 | Kang et al. | 370/331 |
| 2007/0118385 A1 | 5/2007 | Silverstein | |
| 2007/0220100 A1* | 9/2007 | Rosenberg | 709/206 |
| 2007/0226304 A1* | 9/2007 | Virk et al. | 709/206 |
| 2007/0237314 A1* | 10/2007 | Henry et al. | 379/100.08 |
| 2007/0294390 A1 | 12/2007 | Willey | |
| 2008/0046526 A1 | 2/2008 | Lazaridis et al. | |
| 2008/0244070 A1* | 10/2008 | Kita et al. | 709/225 |
| 2009/0240779 A1* | 9/2009 | Tanumihardja et al. | 709/206 |
| 2011/0173685 A1* | 7/2011 | Chai et al. | 726/6 |

OTHER PUBLICATIONS

Merkur Group, Inc.; DeliveryWare Platform: Deliver the advantages of document automation; 2008.

Merkur Group, Inc.; DeliveryWare Solutions Examples; 2007; http://www.merkurgroup.com/products/dwsolutions.asp.

Merkur Group, Inc.; Document Process Automation Solutions; 2007; http://www.merkurgroup.com/solutions/index.asp.

Dan Johnson; Converting PC GUIs for NonPC Devices; Circuit Cellar Ink Feb. 1998; pp. 40-45.

\* cited by examiner

METHODS AND SYSTEMS FOR MANAGING EMAIL CONFIGURATION

CROSS REFERENCE TO RELATED APPLICATION

This application is a continuation of U.S. application Ser. No. 12/059,072, filed 31 Mar. 2008, the disclosure of which is incorporated, in its entirety.

BACKGROUND

Email has become a ubiquitous form of communication. People use email in practically every aspect of life for communicating with each other. Traditionally, email messages were sent and received from desktop computers. In recent years many other types of computing devices have been designed to send and receive email messages. These devices include personal digital assistants, cellular telephones, and many other mobile-computing devices.

Email users may face various frustrations and problems viewing emails and handling attachments on mobile-computing devices. For example, a mobile-device user may send an email to a recipient, and the recipient may send a reply email. The body of the reply email may present quoted text from the original email above the text of the reply. The mobile-device user may waste time scrolling past the quoted text and retrieving additional data before being able to read the reply. Mobile-device users may also receive emails that are too long or otherwise undesirably formatted for optimal viewing on a mobile device.

Mobile device users may also receive emails with attachments that are unusable on a mobile device. For example, a mobile-device user may receive an email with an attachment that is too large to be downloaded to the mobile device. Furthermore, some mobile devices may not be able to open or display certain types of attachments. Receiving unusable attachments on a mobile device may waste transmission bandwidth and mobile-device memory. Traditional email services do not adequately address these mobile-device email attachment and formatting issues.

SUMMARY

The instant disclosure presents various methods and systems for formatting emails. For example, an email-formatting module may identify device-type information in an email message sent from a first user to a second user. The device-type information may provide information about the device that sent the email message (e.g., a model or class of the first device). When a second user sends a reply email (or any other email) message to the first user, the email-formatting module may use the device-type information to select email-configuration information for the reply email message. The email-configuration information may tell the email-formatting module how to reformat the body of the reply email. In other embodiments, the email configuration information may provide the second user with an email formatting recommendation.

Reformatting the body of the second email, which may be the reply email, may comprise moving quoted text from a first location in the second email to a second location of the second email, removing quoted text from the second email, changing a color of text in the second email, changing a font size of text in the second email, changing a font type of text in the second email, and/or changing a background of the second email. The email-formatting module may also reformat the second email in various other ways.

In other embodiments, the email-configuration information may tell the email-formatting module to remove an attachment from the second email. Alternatively, the email-formatting module may suggest to the second user that the second user remove the attachment. If the attachment is removed, the attachment may be stored in a server where it may be accessed later.

According to certain embodiments, the email-formatting module may provide various types of formatting recommendations to the second user. For example, the email-formatting module may prompt the user to remove an attachment from the second email message, offer to store the attachment at a storage location, query the user about reformatting the second email message, and/or alert the user that the second email message is too long.

In some embodiments, the email-formatting module may determine reformatting information based on device-type information that many sender's email agents may include in self-identifying headers. In other embodiments, email-configuration information (which may include device-type information) may be added or inserted into an outgoing email. In such embodiments, the email-configuration information may provide an email-configuration module on a receiving device with at least one email configuration preference of the sender. The email-configuration module may use the email-configuration information to format replies. The email-configuration module may also cache the email-configuration information for future use in formatting email messages addressed to the sender.

The instant disclosure also presents a system with an interface configured to allow a user to input email configuration preferences. For example, the interface may receive an indication of a user's email-configuration preference. A user may select from predefined preferences or create a new preference. A storage module may associate the email-configuration preference with the user so that emails addressed to the user may be reformatted in accordance with the user's preference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
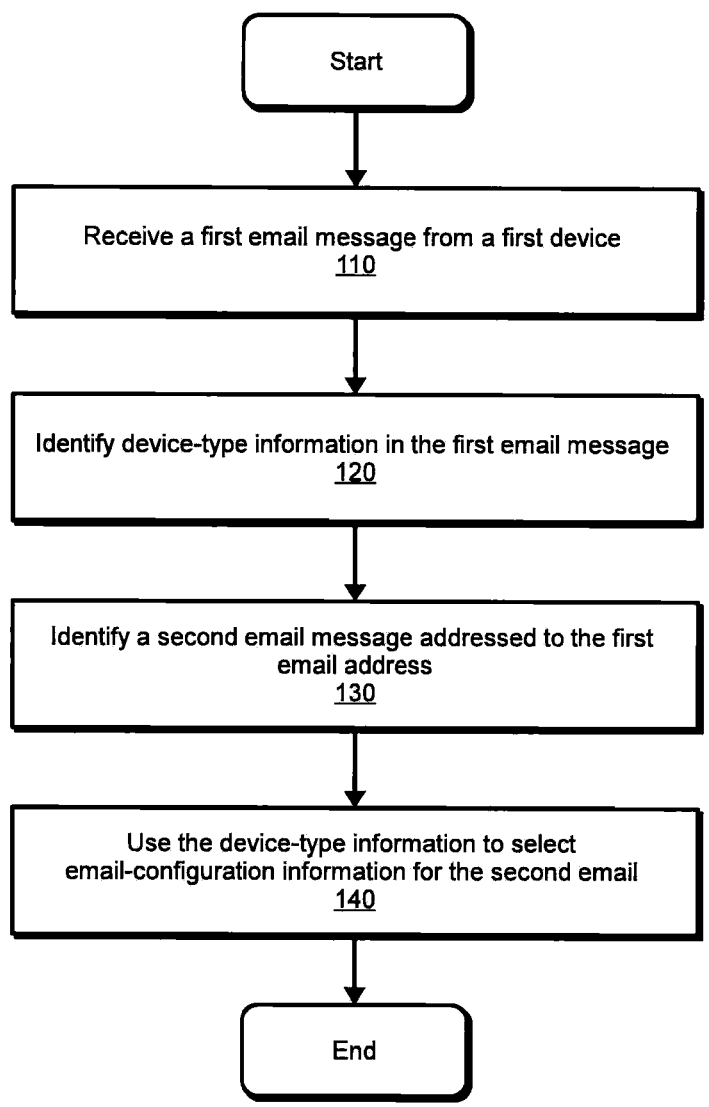
FIG. 1 is a flow diagram of a computer-implemented method for accessing email-configuration information according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The instant disclosure is directed to formatting email messages and providing formatting information to email users. An email-configuration module or email agent on a sender's device may include email-configuration information (e.g., device-type information) in an outgoing email. The outgoing email may be sent to a recipient. In some embodiments, an email-configuration module on the recipient's device may use the email-configuration information to determine how to format future messages addressed to the sender. In other embodiments, a system may provide an email user with an interface configured to allow a user to input email configuration preferences. As discussed in greater detail below, the systems and methods disclosed herein may provide various features and advantages over prior email systems.

FIG. 1 illustrates an exemplary method 100 for using device-type information from a sender's email to select email-configuration information for formatting future emails addressed to the sender. An email agent may receive a first email message from a first device (step 110). The email message may have been sent from a first user with a first email address to a second user. After the email agent receives the first email message, an email-configuration module may identify device-type information in the first email message (step 120). The email-configuration module may be a component of the email agent, a plug-in for the email agent, or a standalone application.

The email-configuration module may identify device-type information by parsing the device-type information from a header of the email or any other section of the email. The email-configuration module may also use any other suitable process for identifying device-type information. In some embodiments, device-type information may be information from a self-identifying header. Many traditional email agents provide device-type information in self-identifying headers.

In some embodiments, the email-configuration module may only use the device-type information for reformatting (or providing reformatting information for) replies to the first email message. In other embodiments, the device-type information may be cached or stored for later use. For example, the email-configuration module may associate the device-type information with the first email address in a database, and the email-configuration module may use the device-type information to identify email-configuration information for any email addressed to the first email address.

Device-type information may provide information about the first device. For example, the device-type information may indicate a model of the first device, a class of the first device, or any other information about the first device. A model of the first device may be a manufacturer's name, a model name, or a model number. A class of the first device may be a type of the first device, such as a personal digital assistant, a desktop computer, a laptop computer, a cellular phone, etc. The email-configuration module may use the device-type information to determine how to configure the first email message. For example, the email-configuration module may configure emails sent to a mobile device differently than emails sent to a desktop computer.

After identifying the device-type information in the first email message, the email-configuration module may identify a second email message addressed to the first email address (step 130). The second email message may be a reply to the first email message. In other embodiments, the second email message may be a new email message addressed to the first email address. The email-configuration module may identify the second email message while the message is being drafted (e.g., at the time the second email is addressed to the first email address) or at the time the second email message is being sent.

The email-configuration module may use the device-type information to select email-configuration information for the second email (step 140). In some embodiments, the email-configuration information may be stored in a configuration-information database. The email-configuration module may search the database for email-configuration information associated with the device-type information. For example, if the device-type information indicates that the device is a mobile device, the email-configuration module may select email-configuration information that tells the module how to configure emails being sent to mobile devices.

In some embodiments, the email-configuration module may use the email-configuration information to automatically reformat a body of the second email. For example, the email-configuration information may state that the text size for email messages being sent to mobile devices should not exceed 12 point font. If the first device is a mobile device, and if the second email contains text with 14 point font, the email-configuration module may reformat the text of the second email to have 12 point font.

Reformatting the body of an email may comprise moving quoted text from a first location in the email to a second location in the email, removing quoted text from the email, changing a color of text in the email, changing the font size of text in the email, changing a font type of text in the email, and/or changing the background of the email. Reformatting the body of an email may also comprise any other suitable reformatting function. The email-configuration module may reformat all or a portion of the body of an email The email-configuration module may perform configuration operations other than formatting the body of an email. For example, the email-configuration module may remove an attachment from an email. In some embodiments, the email-configuration module may store the attachment in an internet server where it may be accessed later. Alternatively, the email-formatting module may suggest to the second user that the second user remove the attachment. If the attachment is removed, the attachment may be stored in a server where it may be accessed later.

According to certain embodiments, the email-formatting module may also provide various types of formatting recommendations to a user. For example, the email-formatting module may prompt the user to remove an attachment from the second email message, offer to store the attachment at a storage location, query the user about reformatting the second email message, and/or alert the user that the second email message is too long. The email-configuration information may also prompt the user with various other types of prompts about the email message. These prompts may help the user format the message appropriately for the type of device to which the message is being sent.

In some embodiments, the email-configuration module may prompt the user with formatting information after the user clicks on a send button or performs some other action that indicates that the user is ready to send the email. In other embodiments, the email-configuration module may prompt the user with formatting information while the user is drafting the email. For example, after the user enters the recipient's email address, the email-configuration module may detect that the email address is associated with email-configuration information and may display the email-configuration information to the user.

As discussed, the method illustrated in FIG. 1 may be performed by an email-configuration module. The email-configuration module may be installed on a computing device as a stand-alone application or as a plug-in to an email client. The email-configuration module may also be a component of an email client. In other embodiments, the email-configuration module may be part of an internet email service or installed in an email gateway.

Figure 2:
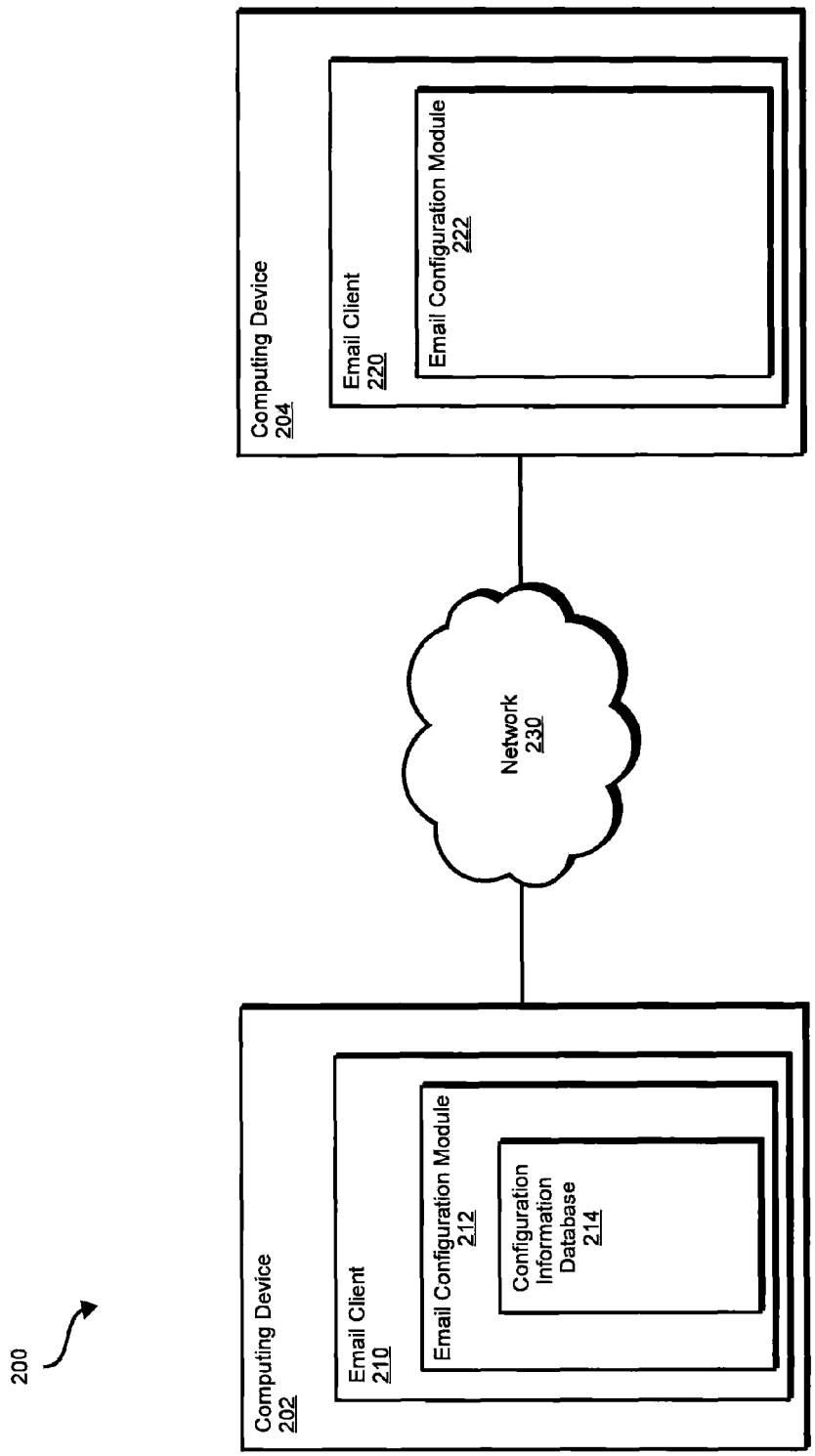
FIG. 2 is a block diagram of an exemplary network according to certain embodiments.

FIG. 2 shows a network 200 with computing devices 202 and 204 connected to a network 230 (e.g., the internet). An email client 210 may be installed on computing device 202, and an email client 220 may be installed on computing device 204. Email client 210 may include an email-configuration module 212, and email client 220 may include an email-configuration module 222. Email-configuration module 212 may include a configuration-information database 214. Email client 220 may send a first email message to email client 210. Email client 210 may receive the first email message from a first user, and email-configuration module 212 may identify device-type information in the first email message.

Email-configuration module 212 may store the device-type information in configuration-information database 214 and associate the device-type information with the first email message. Email-configuration module 212 may associate the device-type information with the first email message by associating the device-type information with the first user's email address, the first user's name, or any other information that may identify the first user.

Email-configuration module 212 may determine that a second user is drafting or sending an email to the first user. After detecting the email addressed to the first user, email-configuration module 212 may search configuration-information database 214 for configuration information associated with the first user. Then, email-configuration module 212 may use the configuration information to reconfigure the email or prompt the user to make changes to the email.

In one example, Ed may be the first user and may use computing device 202 to send and receive email messages. Computing device 202 may be a smartphone. Ed may also own a desktop computer from which he occasionally sends emails. Jack may be the second user, and Jack may use computing device 204 to send and receive emails. Computing device 204 may be a laptop. When Ed sends Jack an email message, email-configuration module 212 may determine from which device the email was sent. If the email message was sent from Ed's smartphone, email-configuration module 212 may configure a reply to the email message in a manner optimal for viewing email messages on a smartphone.

Email-configuration module 212 may also determine which device Ed uses more frequently for sending emails. For example, if Ed typically uses his smartphone, rather than his desktop, to send emails, email-configuration module 212 may cache this information. Then, when Jack drafts a new email addressed to Ed, email-configuration module 212 may display an email-configuration prompt to Jack. The email-configuration prompt may tell Jack that Ed typically uses his smartphone to receive emails, and may ask Jack whether he wants to apply smartphone formatting rules to the email message.

Figure 3:
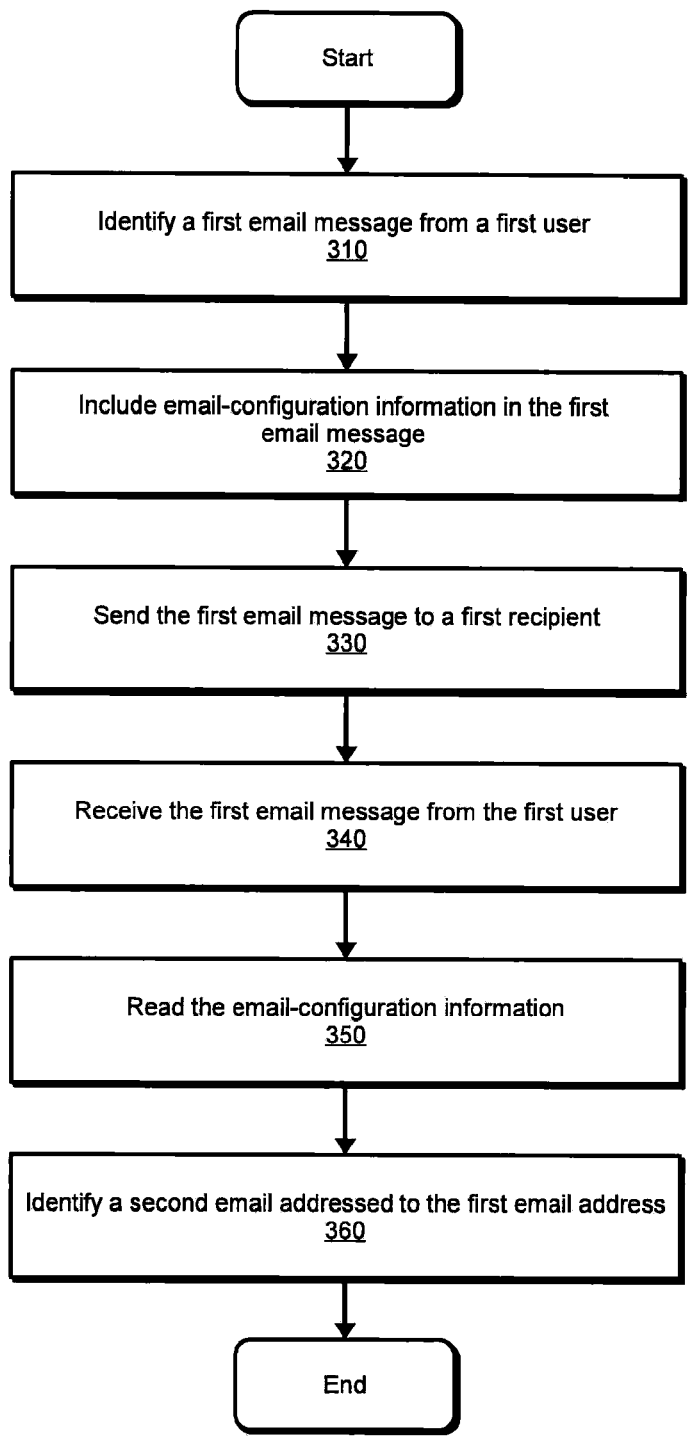
FIG. 3 is a flow diagram of a computer-implemented method for including email-configuration information in an email according to certain embodiments.

FIG. 3 is a block diagram 300 of a computer-implemented method for including email-configuration information in an email message. Email configuration information, as opposed to device-type information, may allow an email sender to be explicit about email-configuration preferences. In some embodiments, email senders may include email-configuration information in outgoing emails in addition to or instead of device-type information. In other embodiments, email-configuration information may include device-type information.

To include email-configuration information in an email, a sender's email-configuration module may identify a first email message from a first user (step 310). The sender's email-configuration module may identify the first email message at the time the email is being drafted, at the time the email is being sent, when the email arrives at an email gateway, or at any other suitable time. The sender's email-configuration module may include email-configuration information in the first email message (step 320). The email-configuration information may be formatted to provide an email-configuration module on the recipient's computer with at least one email-configuration preference of the first user. The email-configuration information may be included in a header of the email or in any other part of the email.

The sender's email-configuration module may then send the first email message to a first recipient (step 330). Upon receiving the first email message from the first user (step 340), the recipient's email-configuration module may read the email-configuration information (step 350). The recipient's email-configuration module may read the email-configuration information at the time the first email message is received, when the recipient drafts a response to the first email message, or at any other time. In some embodiments, the recipient's email-configuration module may cache the email-configuration information. In other embodiments, the recipient's email-configuration module may use the email-configuration information without storing it (e.g., the email-configuration module may pull the email-configuration information directly from the first email message when the recipient of the first email message responds to the first email message).

The recipient's email-configuration module may identify a second email message addressed to the first email address (step 360). The second email message may be a reply to the first email message or a new message addressed to the first email address. The email-configuration module may use the email-configuration information to determine the first user's email formatting and/or attachment handling preferences. In some embodiments, the email-configuration information may explicitly indicate the first user's email-configuration preferences. In other embodiments, the email-configuration information may be implicit information (e.g., device-type information) about how to configure emails sent to the first user.

Figure 4:
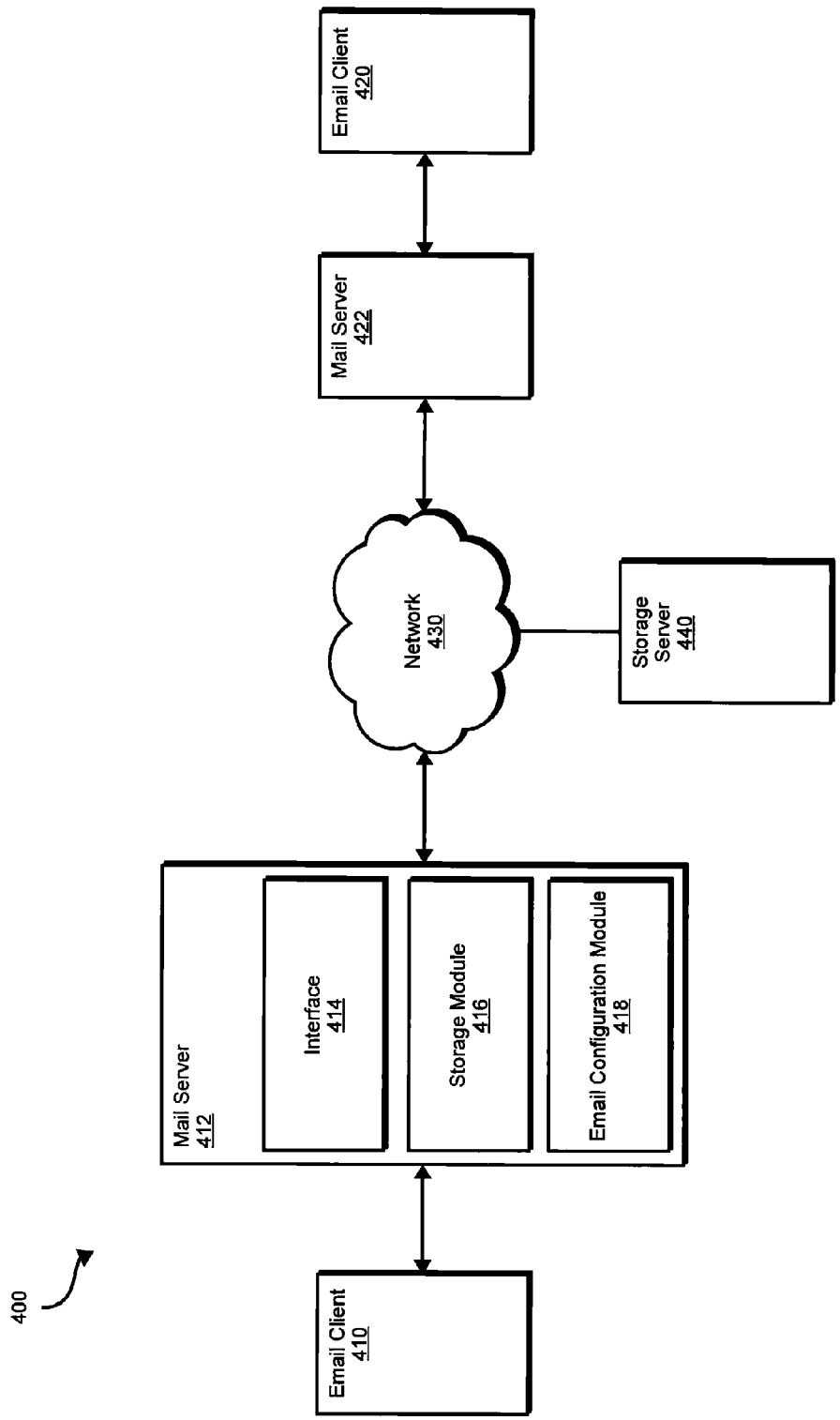
FIG. 4 is another exemplary network for implementing embodiments of the instant disclosure.

FIG. 4 shows a network 400 with mail servers 412 and 422 attached to a network 430. Email client 410 may communicate with mail server 412, and email client 420 may communicate with mail server 422. In some embodiments, mail server 412 may include an interface 414, a storage module 416, and an email-configuration module 418. Interface 414 may be configured to receive an indication of an email-configuration preference. Receiving an indication of an email-configuration preference may involve receiving a preference created by a user (e.g., the user of email client 410) or receiving a user's selection of a predefined preference. Storage module 416 may be capable of associating the email-configuration preference with an email destination of the user.

Mail server 412 may include an input device configured to receive email. Email-configuration module 418 may be programmed to receive an email from the input device and reconfigure incoming (or outgoing) email based on the email-configuration preference. The first user (i.e., the user of email client 410) may store email-configuration preferences using storage module 416. When a second user (i.e., the user of email client 420) sends an email message to the first user, the email message may pass through mail server 422 and network 430 and arrive at mail server 412. Email-configuration module 418 may reconfigure the email based on the first user's email-configuration preferences.

An email-configuration preference may be an email-formatting preference (e.g. font size, font color, text positioning, etc.). In other embodiments, the email-configuration preference may be an attachment-handling preference. For example, the first user's email configuration preference may tell email-configuration module 418 to store email attachments in storage server 440 for later access.

In some embodiments, email-configuration module 418 may use a combination of an email-configuration preference and information about the destination device to determine how to configure the email. For example, if mail server 412 forwards the email to a portable device, the email may be formatted differently than if the email is sent to a personal computer. Information about the destination device may also be detected by mail server 412 when the email is routed through mail server 412 to email client 410. Email client 410 may be on any type of computing device, such as a desktop computer, a laptop computer, a cellular telephone, or any other mobile computing device.

Figure 5:
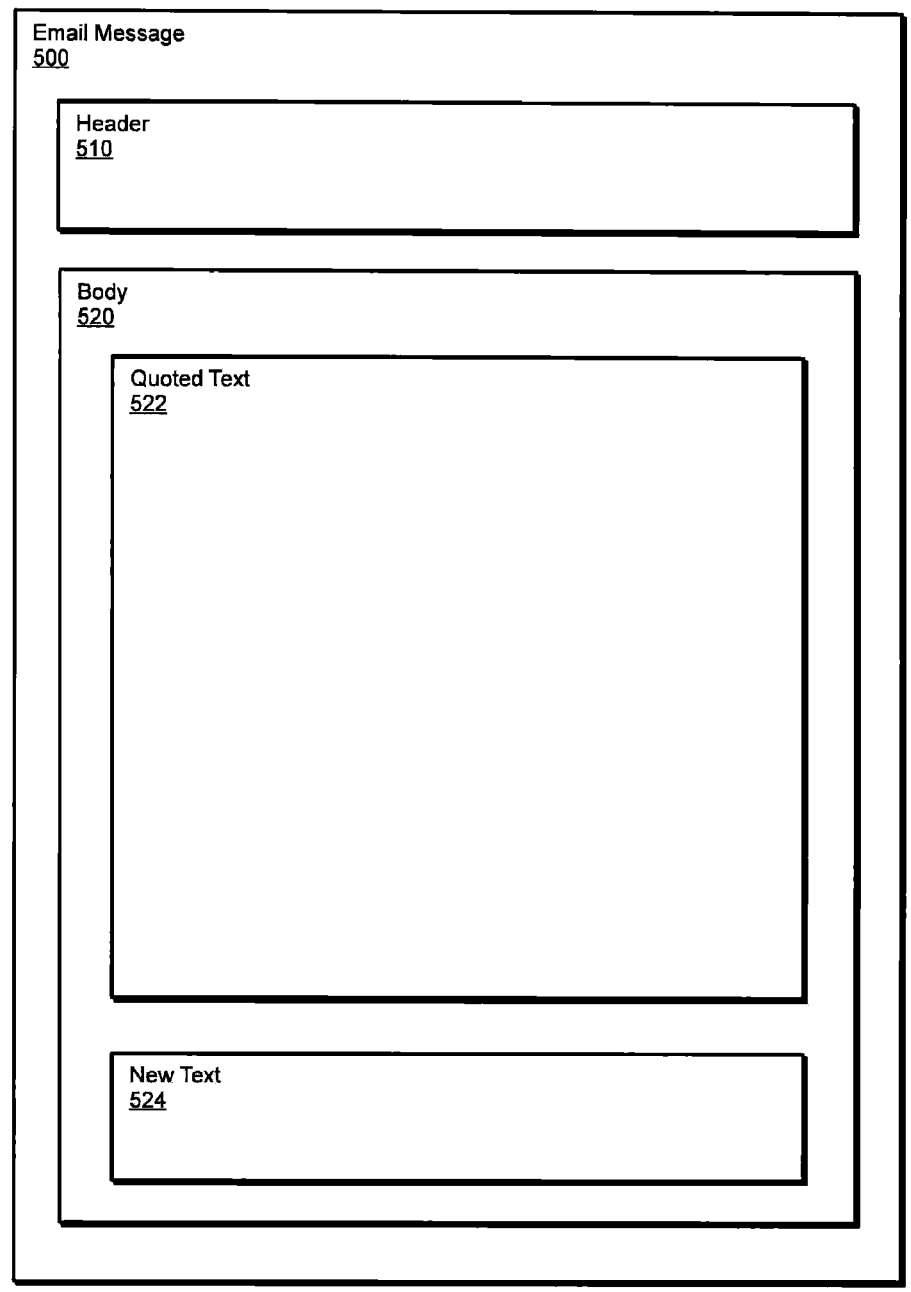
FIG. 5 is a block diagram of an exemplary email message according to certain embodiments.
Figure 6:
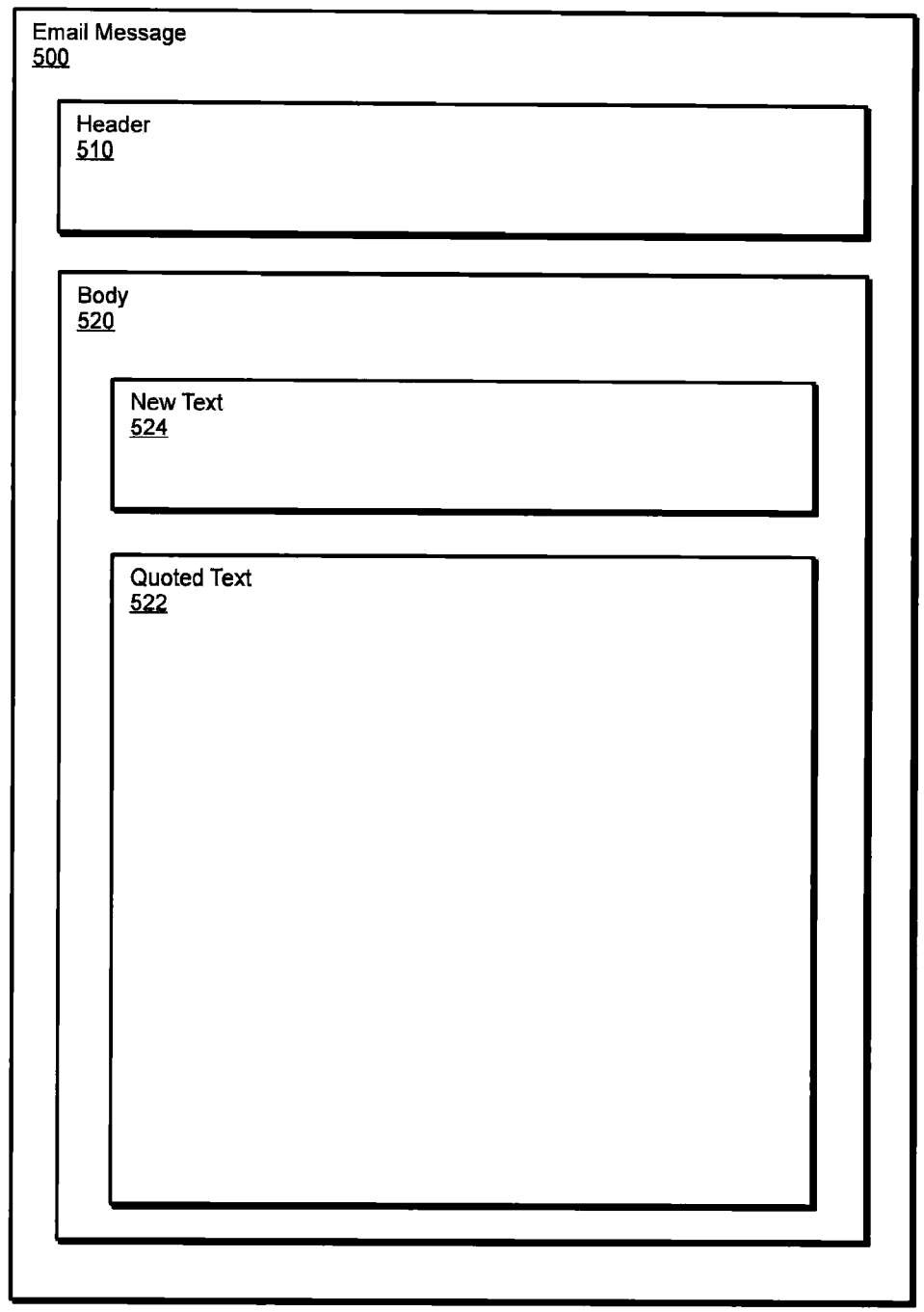
FIG. 6 is a block diagram of the email message in FIG. 5 after the email message is reconfigured.

FIGS. 5 and 6 show an example of email message 500 being reconfigured. Email message 500 may be a reply to an original message. Email message 500 may include a header 510, which may include email-configuration information or device-type information. Email message 500 may also include a body 520. Body 520 may include quoted text 522 (i.e., text from the original message) and new text 524. A recipient of the email may have set an email configuration preference for placing new text before the quoted text. Thus, an email-configuration module may swap the locations of new text 524 and quoted text 522, as shown in FIG. 6.

Figure 7:
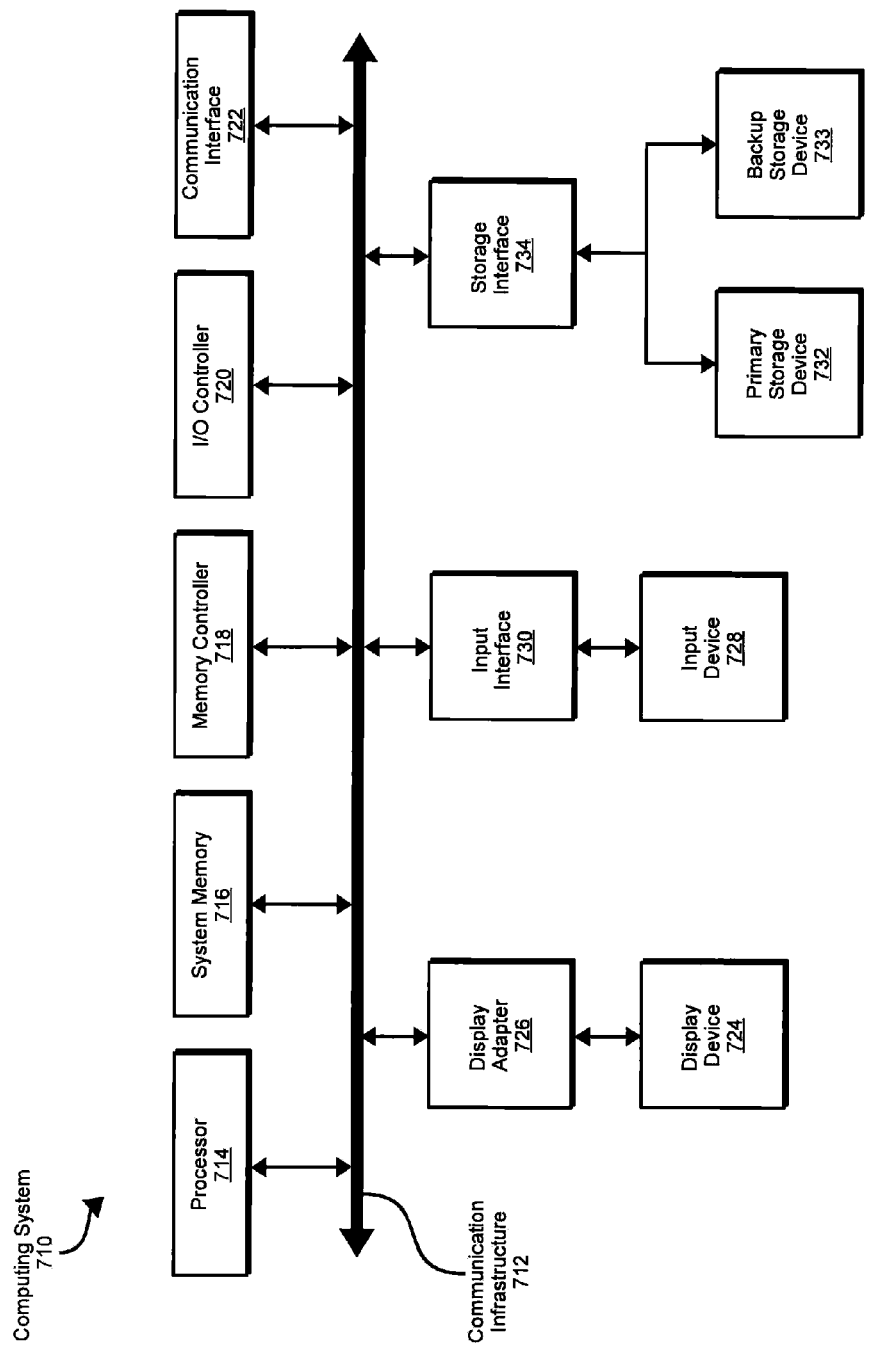
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the receiving, identifying, using, reformatting, moving, changing, removing, providing, prompting, offering, querying, alerting, including, sending, and reading steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as receiving, identifying, using, reformatting, moving, changing, removing, providing, prompting, offering, querying, alerting, including, sending, and reading.

I/O controller 720 generally represents any type or form of module capable of coordinating and/or controlling the input and output functions of a computing device. For example, in certain embodiments I/O controller may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the receiving, identifying, using, reformatting, moving, changing, removing, providing, prompting, offering, querying, alerting, including, sending, and reading steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the receiving, identifying, using, reformatting, moving, changing, removing, providing, prompting, offering, querying, alerting, including, sending, and reading steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the receiving, identifying, using, reformatting, moving, changing, removing, providing, prompting, offering, querying, alerting, including, sending, and reading steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, the exemplary file systems disclosed herein may be stored on primary storage device 732, while the exemplary file-system backups disclosed herein may be stored on backup storage device 733. Storage devices 732 and 733 may also be used, for example, to perform and/or be a means for performing, either alone or in combination with other elements, one or more of the receiving, identifying, using, reformatting, moving, changing, removing, providing, prompting, offering, querying, alerting, including, sending, and reading steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments descried and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
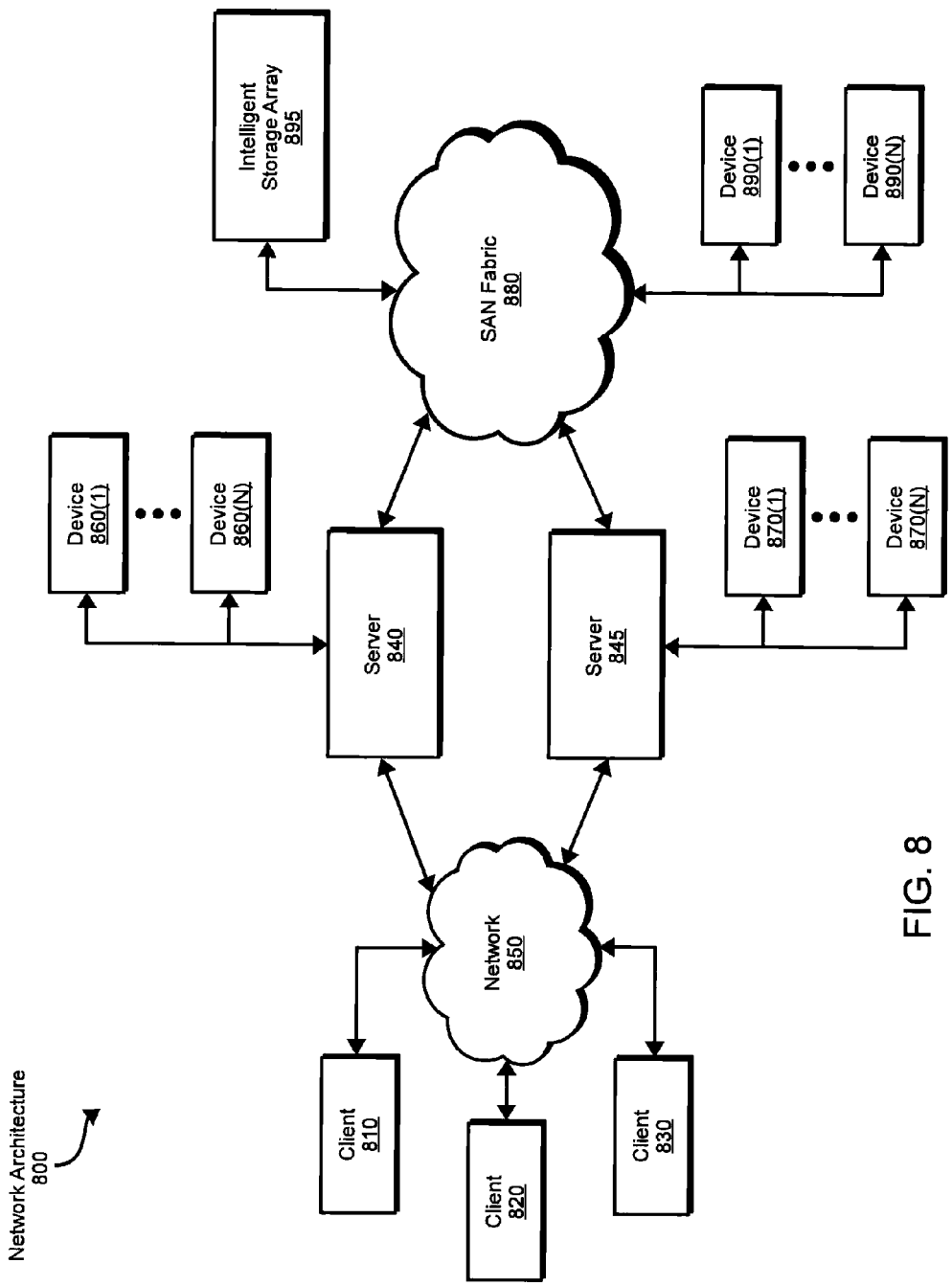
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the receiving, identifying, using, reformatting, moving, changing, removing, providing, prompting, offering, querying, alerting, including, sending, and reading steps disclosed herein. Network architecture 800 may also be used to perform and/or be a means for performing other steps and features set forth in the instant disclosure.

As detailed above, computing system 710 and/or one or more of the components of network architecture 800 may perform and/or be a means for performing, either alone or in combination with other elements, one or more steps of the exemplary methods described and/or illustrated herein. According to certain embodiments, the computer-implemented method may comprise receiving a first email message from a first email address. The first email message may be sent from the first device. The method may also comprise identifying device-type information in the first email message. The device-type information may provide information about the first device. The method may also comprise identifying a second email message addressed to the first email address. The method may further comprise using the device-type information to select email-configuration information for the second email.

A configuration-information database may comprise the email-configuration information. In some embodiments, the method may comprise reformatting a body of the second email based on the email-configuration information. The email-configuration information may comprise formatting information. In other embodiments, formatting the body of the second email may comprise at least one of: moving quoted text from a first location in the second email to a second location of the second email, changing the color of text in the second email, changing the font size of text in the second email, changing the font type of text in the second email, and/or changing the background of the second email.

In some embodiments, the method may comprise removing an attachment to the second email in response to the email-configuration information. Removing an attachment to the second email may comprise storing the attachment in an internet server. According to some embodiments, the method may further comprise providing a user with the email-configuration information of the second email message.

In at least one embodiment, providing the user with the email-configuration information for the second email message may comprise at least one of prompting the user to reformat the second email message, prompting the user to remove an attachment from the second email message, offering to store the attachment at a storage location, querying the user about reformatting the second email message, and/or alerting the user that the second email message is too long.

According to various embodiments, the computer-implemented method may comprise associating the device-type information with the first email address and saving the association. In various embodiments, identifying a second email message addressed to the first email address may comprise identifying a reply to the first email address. In such embodiments, the second email message may comprise the reply.

According to various embodiments, the device-type information may comprise at least one of a model of the device, a class of the first device, and/or other data from the header of the first email. In at least one embodiment, accessing email-configuration information may be performed by at least one of email gateway and an email client.

According to certain embodiments, a computer-implemented method may comprise identifying a first email message from a first user, and including email-configuration information in the first email message. The email-configuration information may be formatted to provide an email-configuration module with at least one email-configuration preference of the first user. The method may also comprise sending the first email message to a first recipient.

In some embodiments, the method may further comprise receiving the first email message from a first email address and reading the email-configuration information after receiving the first email message. The email-configuration information may be read by the email-configuration module. The method may also comprise identifying a second email message addressed to the first email address.

In some embodiments, reading the email-configuration information may comprise associating the email-configuration information with the first email address and storing the association. The method may further comprise at least one of: reformatting a body of the second email message based on the email-configuration information. The email-configuration information may comprise formatting information. The method may also comprise removing an attachment to the second email message in response to the email-configuration information. The method may comprise providing a user with email-configuration information for the second email message.

In some embodiments, including email-configuration in the first email message may be performed by at least one of an email gateway and/or an email client. The email-configuration information may be included in the header of the first email. In certain embodiments, a system may comprise an interface configured to receive an indication of an email-configuration preference. The system may also include a storage module programmed to associate the email-configuration preference with an email destination and an input device configured to receive email. The system may further comprise an email-configuration module programmed to reconfigure an email addressed to the email destination according to the email-configuration preference.

In at least one embodiment, the email-configuration preference may comprise at least one of an email-formatting preference and/or an attachment-handling preference. The email-configuration module may also be programmed to reconfigure email based on destination-device type and the email-configuration preference.

We claim:

1. A computer-implemented method for managing email configuration, at least a portion of the method being performed by a computing device comprising at least one processor, the method comprising:
   receiving a first email from a first device, the first email being:
      received on a second device;
      sent from a first email address;
   identifying, on the second device, device-type information in a header of the first email, the device-type information indicating a device type of the first device;
   identifying, on the second device, a second email addressed to the first email address;
   using the device-type information in the header of the received first email to select, from a configuration-information database, email-configuration information for configuring the second email directed to the same first email address that sent the first email.

2. The computer-implemented method of claim 1, further comprising reformatting, on the second device, a body of the second email based on the email-configuration information, the email-configuration information comprising formatting information.

3. The computer-implemented method of claim 2, wherein reformatting the body of the second email comprises at least one of:
   moving quoted text from a first location in the second email to a second location of the second email;
   removing quoted text from the second email;
   changing a color of text in the second email;
   changing a font size of text in the second email;
   changing a font type of text in the second email;
   changing a background of the second email.

4. The computer-implemented method of claim 1, further comprising removing an attachment to the second email in response to the email-configuration information.

5. The computer-implemented method of claim 4, wherein removing the attachment to the second email comprises storing the attachment in an internet server.

6. The computer-implemented method of claim 1, further comprising providing a user of the second device with the email-configuration information for configuring the second email.

7. The computer-implemented method of claim 6, wherein providing the user of the second device with the email-configuration information for configuring the second email comprises at least one of:
   prompting the user to reformat the second email;
   prompting the user to remove an attachment from the second email;
   offering to store the attachment at a storage location;
   querying the user about reformatting the second email;
   alerting the user that the second email is too long.

8. The computer-implemented method of claim 1, further comprising associating the device-type information with the first email address and saving the association on the second device.

9. The computer-implemented method of claim 1, wherein identifying the second email addressed to the first email address comprises identifying a reply to the first email address on the second device, the second email comprising the reply.

10. The computer-implemented method of claim 1, wherein the device-type information comprises at least one of:
   a model of the first device;
   a class of the first device.

11. The computer-implemented method of claim 1, wherein selecting the email-configuration information comprises accessing the email-configuration information by at least one of:
   an email gateway;
   an email client.

12. A computer-implemented method for managing email configuration, at least a portion of the method being performed by a computing device comprising at least one processor, the method comprising:
   identifying, on a first device, a first email to be sent from a first user of the first device to a second user of a second device;
   including, on the first device, email-configuration information in a header of the first email, the email-configuration information being formatted to provide an email-configuration module with at least one email configuration preference specified by the first user;

sending the first email from the first device to the second device, the first email being addressed to the second user of the second device from the first user of the first device, thereby enabling the email-configuration module to use the email-configuration information in the header of the first email to ascertain the email configuration preference specified by the first user that sent the first email.

13. The computer-implemented method of claim 12, further comprising:
   receiving, on the second device, the first email from a first email address associated with the first user of the first device;
   reading, on the second device, the email-configuration information included in the first email, the email-configuration information being read by the email-configuration module;
   identifying, on the second device, a second email addressed to a destination email address;
   determining, by the second device and based on the destination email address being the same as the first email address, that the second email is directed to the first user.

14. The computer-implemented method of claim 13, wherein reading the email-configuration information comprises associating the email-configuration information with the first email address and storing the association on the second device.

15. The computer-implemented method of claim 13, further comprising at least one of:
   reformatting, on the second device, a body of the second email based on the email-configuration information, the email-configuration information comprising formatting information;
   removing, on the second device, an attachment to the second email in response to the email-configuration information;
   providing the second user of the second device with reconfiguration information for the second email, the email-configuration information comprising the reconfiguration information.

16. The computer-implemented method of claim 12, wherein the email configuration preference of the first user is created by the first user.

17. The computer-implemented method of claim 12, wherein including the email-configuration in the header of the first email is performed by at least one of an email gateway and/or an email client.

18. A system for managing email configuration, the system comprising:
   a memory that stores an e-mail configuration module;
   an email client programmed to receive a first email from a first device, the first email being:
      received on a second device;
      sent from a first email address;
   the email-configuration module programmed to:
      identify, on the second device, device-type information in a header of the first email, the device-type information indicating a device type of the first device;
      identify, on the second device, a second email addressed to the first email address;
      use the device-type information in the header of the received first email to select, from a configuration-information database, email-configuration information for configuring the second email directed to the same first email address that sent the first email;
   at least one physical processor that executes the email-configuration module.

19. The system of claim 18, further comprising an email-formatting module programmed to format, on the second device, a body of the second email based on the email-configuration information, the email-configuration information comprising formatting information.

20. The system of claim 19, wherein the email-formatting module is programmed to reformat the body of the second email by performing at least one of:
   moving quoted text from a first location in the second email to a second location of the second email;
   removing quoted text from the second email;
   changing a color of text in the second email;
   changing a font size of text in the second email;
   changing a font type of text in the second email;
   changing a background of the second email.

\* \* \* \* \*